United States Patent [19]

Southworth, Jr.

[11] 4,448,041

[45] May 15, 1984

[54] VACUUM INSULATED WALLS FOR REFRIGERATED CONTAINERS AND TRAILERS

[75] Inventor: John V. D. Southworth, Jr., Cazenovia, N.Y.

[73] Assignee: Trans Refrigeration International, Inc., East Syracuse, N.Y.

[21] Appl. No.: 426,926

[22] Filed: Sep. 29, 1982

[51] Int. Cl.³ ............................................. F25B 19/00
[52] U.S. Cl. ........................................ 62/268; 62/239; 62/440
[58] Field of Search ................. 62/239, 268, 269, 270, 62/440 X, 447; 105/357

[56] References Cited

U.S. PATENT DOCUMENTS 1,246,817 11/1917 Jones ................................. 105/357
2,786,342 3/1957 Goetz ............................... 62/268 X
3,786,652 1/1974 Bolynn ............................. 62/268 X Primary Examiner—Lloyd L. King
Attorney, Agent, or Firm—Bruns & Jenney

[57] ABSTRACT

Refrigerated containers and trailers comprised of structural members in the form of vacuum insulated sidewalls, ceilings and floors having a thickness of approximately one inch. Each structural member is divided into a plurality of individual airtight sections and for each section there is a conduit that leads from the interior of the section to a vacuum pump via a manifold. By means of the pump, air can be withdrawn from each section to establish a vacuum therein. The manifold into which all of the conduits lead is provided with a pressure switch that responds to an increase in pressure caused by a leak in any section and actuates the vacuum pump whereby air is withdrawn from the leaking section.

4 Claims, 4 Drawing Figures

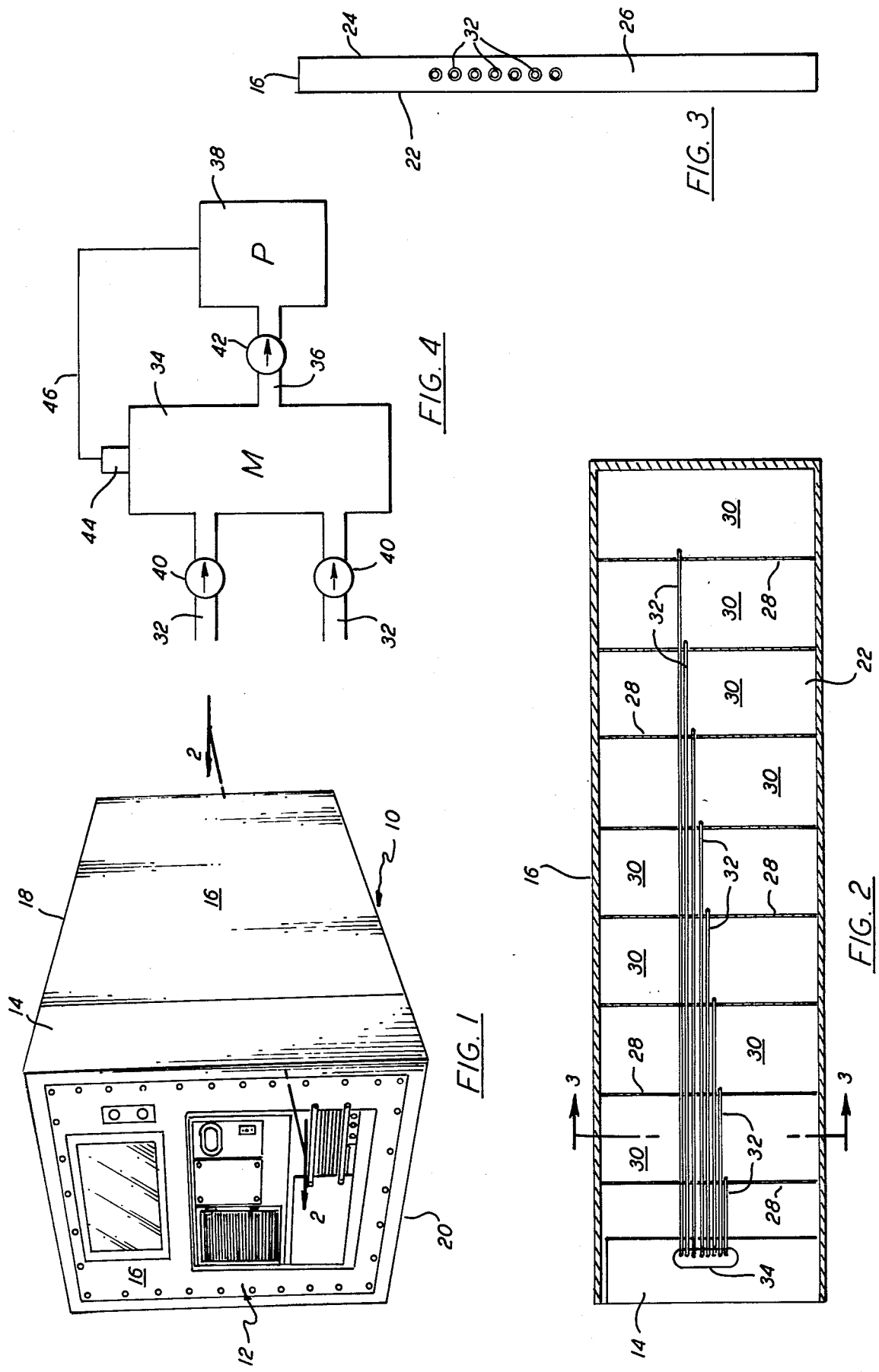

VACUUM INSULATED WALLS FOR REFRIGERATED CONTAINERS AND TRAILERS

BACKGROUND OF THE INVENTION

This invention relates generally to refrigeration systems, and has particular reference to a novel construction for refrigerated containers and trailers.

At the present time, most intermodal refrigerated containers and refrigerated trailers use polyurethane or a similar type of insulation in the walls, ceilings and floors. Normally, the layer of polyurethane must be approximately three inches thick to provide the insulation required. Since the amount of available space for the refrigerated product is very important to users of the containers and trailers, it will be apparent that a reduction in the thickness of the container walls, ceilings and floors without sacrificing the quality of insulation would be desirable. The present invention is directed to this objective and achieves a substantial thickness reduction through use of vacuum as the insulation medium.

The applicant is aware of the fact that vacuum insulation has previously been utilized in refrigerated train cars as is evidenced by U.S. Pat. Nos. 1,237,146 to J. J. Armstrong and 1,246,817 to C. C. Jones, these patents representing the closest prior art known to the applicant. The present invention is believed to be a marked improvement over the Armstrong and Jones constructions as will become apparent as the description proceeds. Other pertinent prior art, developed in the course of a preliminary search, is disclosed in U.S. Pat. Nos. 1,278,529; 1,330,361; 1,984,261; 2,229,079; 2,229,081 and 2,381,796.

SUMMARY OF THE INVENTION

The present invention provides for intermodal refrigerated containers and refrigerated trailers comprised of structural members in the form of vacuum insulated sidewalls, ceilings and floors having a thickness of approximately one inch. Unlike the Armstrong and Jones patents cited above, each structural member is divided into a plurality of individual airtight sections and for each section there is a conduit that leads from the interior of the section to a vacuum pump via a manifold or header. By means of the pump, air can be withdrawn from each section to establish a vacuum therein.

Due to the sectional construction, a leak in one section will not normally destroy the integrity of the insulation for the structural member as a whole. Moreover, the manifold into which all of the conduits lead is provided with a pressure switch that responds to an increase in pressure caused by a leak and actuates the vacuum pump whereby air is withdrawn from the leaking section. The conduit for each structural member section includes a check valve that permits air to be withdrawn from the section but prevents the flow of air in the opposite direction.

BRIEF DESCRIPTION OF THE DRAWINGS

FIG. 1 is a front perspective view of a refrigerated container embodying the present invention;

FIG. 2 is a vertical longitudinal section through a sidewall of the container taken substantially on line 2—2 of FIG. 1;

FIG. 3 is an enlarged transverse section through the container sidewall of FIG. 2, taken substantially on line 3—3 thereof; and FIG. 4 is a block diagram illustrating the controls for the vacuum insulated sidewall of FIG. 1.

DESCRIPTION OF THE PREFERRED EMBODIMENT

Having reference now to the drawings, 10 generally indicates a refrigerated container adapted for use in domestic or intermodal container refrigeration systems. Container 10 includes a conventional refrigeration system generally indicated at 12, the refrigeration system being located in a separate section 14 at one end of the container. In accord with the invention, the sidewalls 16, ceiling 18 and floor 20 of the container utilize vacuum as the insulation medium which enables these structural members to be relatively thin, e.g. in the nature of one inch thick.

FIGS. 2 and 3 illustrate diagrammatically the construction of a container sidewall 16, and it should be understood that the construction of the ceiling and floor is essentially the same. Sidewall 16 is comprised of interior and exterior walls 22 and 24, FIG. 3, that are secured together in spaced relation to one another so that an airtight compartment 26 is formed between the walls. The compartment 26 is divided by a plurality of suitable stud members 28 into a plurality of individual airtight sections 30 of approximately equal volume.

For each airtight section 30 there is a conduit 32 that leads from the interior of the section to a manifold or header 34. As indicated in FIG. 3, the conduits are located between the interior and exterior walls 22,24 and the manifold is preferably located in the refrigeration section 14, FIG. 2. The manifold 34 is connected by a suitable conduit 36, FIG. 4, to a vacuum pump 38, only two of the conduits 32 being shown in the diagrammatic illustration of FIG. 4 for simplicity. The vacuum pump is also preferably located in the refrigeration section 14.

Each conduit 32 is provided with a check valve 40, FIG. 4, which permits air to be withdrawn from the airtight section 30 associated with the conduit but prevents the flow of air in the opposite direction. Similarly, a check valve 42 is incorporated in the conduit 36 whereby the pump 38 can withdraw any air entering the manifold 34 from the airtight sections 30 but no air can flow in the opposite direction.

It is contemplated that a vacuum will be drawn in the airtight sections 30 during manufacture of the sidewall, ceiling and floor structural members. However, it is possible that a small leak could develop in any of the sections at any time and the construction just described enables air that might leak into a section to be immediately evacuated therefrom. To this end, the manifold 34 is provided with a known type of pressure switch 44, FIG. 4, that can sense any appreciable air leakage and through an electrical connection 46 turn on the vacuum pump 38. In this connection, it should be emphasized that due to the sectional construction of the structural members, a leak in one section will not normally destroy the integrity of the insulation for the structural member as a whole. It is also important that, unlike most prior art arrangements, the vacuum pump of the invention only operates in response to air leakage detected by the pressure switch and otherwise does not operate.

With a reduction in the wall thickness of the structural members from approximately three inches to one inch, it is estimated that approximately 8% more cargo space will be made available in a 40 foot container or trailer. Moreover, in a container of this size, elimination of the conventional polyurethane insulation would result in a weight reduction of approximately 640 pounds while adding a vacuum pump and related equipment would only add back approximately 150 pounds. A container as contemplated by the invention can also be manufactured more economically because there would be a reduction in the cost of labor and materials. With 8% more cargo space in a container having the same outside dimensions as a conventional container, fewer containers will be needed to carry the same amount of goods with commensurate savings in the cost of maintenance and repairs in the energy required for operation.

From the foregoing description it will be apparent that the invention provides a novel and highly advantageous construction for refrigerated containers and trailers. As will be understood by those familiar with the art, the invention may be embodied in other specific forms without departing from the spirit or essential characteristics thereof.

I claim:

1. In a refrigerated container or trailer, an insulated structural member adapted for use as a sidewall, ceiling or floor of the container, the structural member comprising an interior and an exterior wall of like dimensions, means securing the walls together in spaced relation to one another whereby an airtight compartment is formed between the walls, means for dividing said airtight compartment into a plurality of individual airtight sections, a manifold in the container, a conduit extending from each airtight section to the manifold, a vacuum pump connected to the manifold for withdrawing air from each section to create a vacuum therein, a check valve in the conduit for each section that permits air to be withdrawn from the section but prevents the flow of air in the opposite direction, and a pressure switch in communication with the manifold for detecting an increase in pressure therein, the pressure switch being operable in response to a predetermined pressure increase to actuate the vacuum pump.

2. Structure as defined in claim 1 wherein the conduits extending from each airtight section to the manifold are located between the interior and exterior walls of the structural member.

3. In a refrigerated container or trailer, an insulated structural member adapted for use as a sidewall, ceiling or floor of the container, the structural member comprising an interior and an exterior wall of like dimensions, means securing the walls together in spaced relation to one another whereby an airtight compartment is formed between the walls, spaced vertically disposed stud members in the airtight compartment for dividing it into a plurality of individual airtight sections, a manifold in the container, a separate conduit for each airtight section, the conduits extending from their respective sections to the manifold, a vacuum pump connected to the manifold for withdrawing air from each section to create a vacuum therein, a check valve in the conduit for each section that permits air to be withdrawn from the section but prevents the flow of air in the opposite direction, and a pressure switch in communication with the manifold for detecting an increase in pressure therein, the pressure switch being operable in response to a predetermined pressure increase to actuate the vacuum pump.

4. Structure as defined in claim 3 wherein the conduits extending from each airtight section to the manifold are located between the interior and exterior walls of the structural member.

* * * * *